(No Model.) 2 Sheets—Sheet 1.
N. M. LANGDON.
TUYERE.
No. 459,470. Patented Sept. 15, 1891.
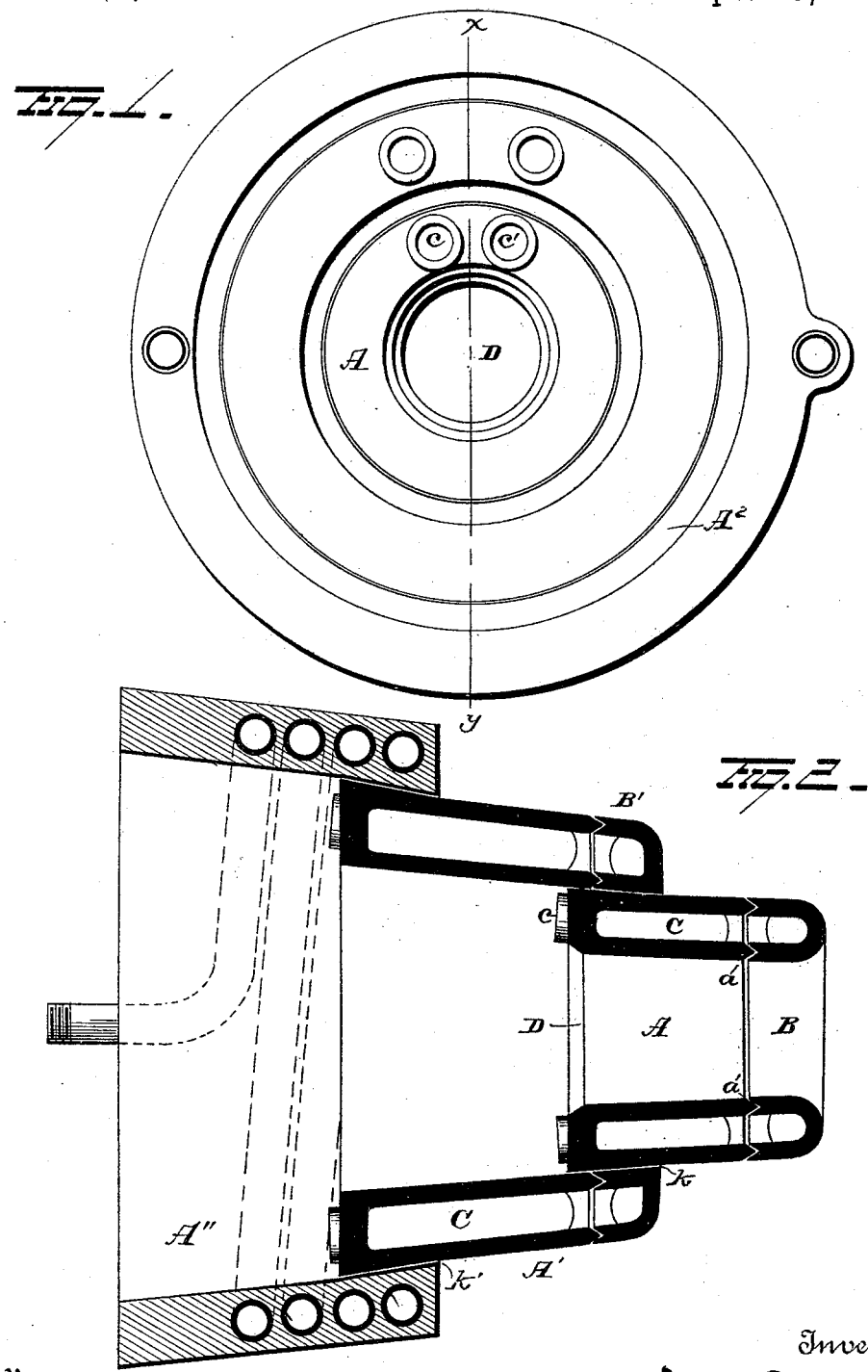
Witnesses
E. J. Nottingham
G. F. Downing
Inventor
N. M. Langdon
By H. A. Seymour
Attorney (No Model.) 2 Sheets—Sheet 2.
N. M. LANGDON.
TUYERE.
No. 459,470. Patented Sept. 15, 1891.
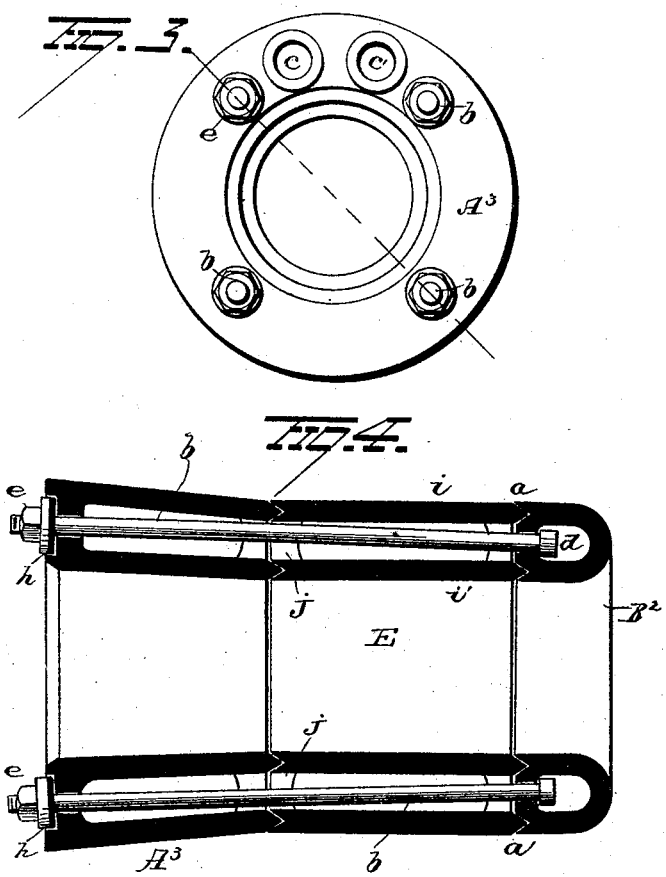
Witnesses
C. V. Nottingham
G. F. Downing
Inventor
N. M. Langdon
By H. A. Symmons
Attorney

UNITED STATES PATENT OFFICE.

NELSON M. LANGDON, OF PORT HENRY, NEW YORK.

TUYERE.

SPECIFICATION forming part of Letters Patent No. 459,470, dated September 15, 1891.

Application filed January 30, 1891. Serial No. 379,682. (No model.)

*To all whom it may concern:*

Be it known that I, NELSON M. LANGDON, a citizen of Port Henry, in the county of Essex and State of New York, have invented certain new and useful Improvements in Tuyeres; and I do hereby declare the following to be a full, clear, and exact description of the invention, such as will enable others skilled in the art to which it appertains to make and use the same.

My invention relates to tuyeres, and more particularly to an improvement in the construction and arrangement of that class of tuyeres and breasts adapted for use in smelting-furnaces for the purpose either of introducing the air-blast into or removing the molten slag from the furnace, the object of my invention being to so construct and arrange tuyeres and breasts as to reduce the expense for removal and repairs to a minimum.

With this object in view the invention consists in constructing the tuyere or breast or both of two or more detachable parts or sections suitably connected and held together; and the invention consists, also, in certain novel features of construction and combinations and arrangements of parts, as hereinafter set forth, and pointed out in the claims.

In the accompanying drawings, Figure 1 is a front view of my improved tuyere and breast. Fig. 2 is a sectional view on the line $x\,x$ of Fig. 1. Fig. 3 is a sectional view of a modification. Fig. 4 is a front view of the same. Fig. 5 is a view of the connecting end of a detachable nose-piece.

The tuyere and breast being constructed substantially the same, a description of the tuyere will suffice for both. The tuyere, constructed of two parts, consists of a main body or butt A and a smaller part or nose B, joined at $a\,a'$ and held together by soldering or brazing and provided with an annular water-chamber C for the circulation of water, orifices $c\,c'$ for the entrance and exit of the same, and a central passage D. Instead of soldering or brazing, the parts or sections may be held together, as shown in Figs. 3, 4, and 5, with bolts $b$, provided with heads $d$ at one end and nuts $e$ at the other, the heads of the bolts engaging in slotted bridges $f$ of the nose-piece and the other ends of the bolts passing through the end of the butt $A^3$. A gasket or packing of asbestus or other suitable material may be interposed in the joints $a\,a'$, also under the nuts at $h$, in order to make the joints water-tight. If the parts are soldered or brazed together, they may be readily detached by heating until the solder is melted.

Sometimes it is desirable to lengthen the tuyeres or breasts. This may be done by the interposition between the butt $A^3$ and the nose-piece $B^2$ of the extension-piece E, consisting of the two concentric shells $i\,i'$, held apart by the bridges $j$, as shown in Fig. 4. If desired, more than one extension-piece may be inserted.

In Fig. 2 is shown in section the arrangement of a tuyere in its breast. The outer shell of the butt A of the tuyere is made tapering and of sufficient size to fit the tapered inner end of the nose-piece $B'$ of the breast, metal to metal, as shown at $k$. It is evident that the butt $A'$ of the breast may be arranged in the same manner to fit into the larger breast $A^2$, as shown at $k'$.

The tuyere may be arranged with one or more breasts, and instead of my improved breast any form of breast may be adapted for the reception of the tuyeres and make a joint, metal to metal, as shown at $k$ and $k'$.

Having fully described my invention, what I claim as new, and desire to secure by Letters Patent, is—

1. A tuyere and breast, one within and projecting forwardly of the other, said tuyere and breast each having a separate removable nose-piece, substantially as set forth.

2. In a tuyere or breast consisting of two or more parts or sections, the method of connecting or joining one section to the other by soldering or brazing.

3. The combination, in a tuyere consisting of two or more parts or sections, of bolts adapted to engage in slotted bridges of the nose-piece and hold the parts or sections together.

4. In a tuyere consisting of two or more parts or sections, slotted bridges connecting the outer and inner shells of the nose-piece and adapted to receive the heads of bolts for holding the sections together, substantially as set forth.

5. A tuyere or breast consisting of a series of parts or sections, each part or section consisting of two concentric shells, the whole when joined together having a central passage-way, and an annular closed chamber between the shells, provided with entrance and exit orifices and adapted for the circulation of water.

6. The combination, with a tuyere consisting of two or more detachable parts or sections, each part or section consisting of two concentric shells, the whole when joined together having a central passage-way, and an annular closed chamber between the shells, provided with entrance and exit orifices and adapted for the circulation of water, of a tuyere-breast adapted for the reception of the tuyere, the outer shell of the large end of the tuyere being in contact with the inner shell of the nose of the breast and forming a joint, metal to metal, substantially as set forth.

In testimony whereof I have signed this specification in the presence of two subscribing witnesses.

NELSON M. LANGDON.

Witnesses:
  WILLIAM TAYLOR,
  C. J. HARRIS.